June 24, 1952  G. H. COOK  2,601,368
FOUR-COMPONENT OBJECTIVES HAVING TWO DIVERGENT COMPOUND MENISCUS
COMPONENTS POSITIONED BETWEEN TWO SIMPLE CONVERGENT COMPONENTS
Filed Nov. 24, 1950
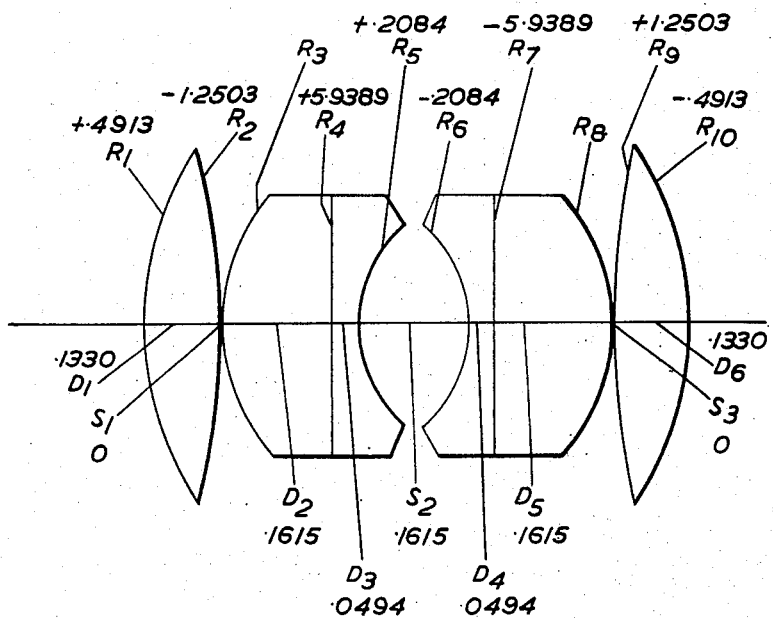
Inventor
Gordon H. Cook
By Emery, Holcomb & Blair
Attorney

Patented June 24, 1952

2,601,368

UNITED STATES PATENT OFFICE 2,601,368

FOUR-COMPONENT OBJECTIVES HAVING TWO DIVERGENT COMPOUND MENISCUS COMPONENTS POSITIONED BETWEEN TWO SIMPLE CONVERGENT COMPONENTS

Gordon H. Cook, Leicester, England, assignor to Taylor, Taylor & Hobson Limited, Leicester, England, a company of Great Britain Application November 24, 1950, Serial No. 197,318
In Great Britain December 14, 1949

7 Claims. (Cl. 88—57)

This invention relates to an optical objective, intended more especially but not exclusively for photographic purposes, corrected for spherical and chromatic aberrations, coma, astigmatism, field curvature and distortion, and comprising two divergent compound meniscus components, each consisting of a convergent element and a divergent element, located between two simple convergent components. It has been proposed in such objectives to control zonal spherical aberration by suitable arrangement of the cemented surfaces in the inner components in relation to the mean refractive indices of the materials used in such components. In practice, however, it has usually been found that this aberration can only be reduced in this way at the expense of oblique spherical aberration.

The present invention has for its object to provide an improved objective of this kind, well corrected for a narrow field, but having a higher degree of correction than hitherto for all chromatic aberrations and for both zonal spherical aberration and oblique spherical aberration.

One way of achieving such a result forms the subject of the present applicant's copending patent application of the United States of America Serial No. 153,517, filed April 3, 1950, by replacing the simple outer components of the objective by suitably arranged compound components. In the present invention the desired result is obtained whilst still employing simple outer components.

In the objective according to the present invention, the four convergent elements of the objective are all made of materials having mean refractive indices between 1.35 and 1.50 and Abbé V numbers between 70 and 110, whilst at least one of the air-exposed surfaces of the objective is aspherical and of such a shape that at any radial distance from the optical axis the thickness of the associated element is slightly greater than it would be with a true spherical surface whose curvature is the same as that at the vertex of the aspherical surface. The shape of the aspherical surface, or of each aspherical surface, is preferably such that at any radial distance from the axis the extra thickness of the associated element due to the asphericity does not exceed .03 times such radial distance.

It should be mentioned that the use of an aspherical surface or surfaces in this way not only enables good correction to be provided for zonal spherical aberration, but also permits correction of the additional astigmatism introduced by providing good correction elsewhere in the objective for oblique spherical aberration.

The aspherical surface, or each aspherical surface, preferably, consists of a surface of revolution generated by rotation about the optical axis of a curve of the form $y^2 = ax + bx^2 + \ldots$ higher powers of $x$, where the $y$-coordinate represents radial distances from the optical axis and the $x$-coordinate distances from the vertex along such axis, whilst $a, b \ldots$ are constants. It is often convenient to confine the shape of the surface to that generated by rotation of a conic section, in which case there will be only two terms on the right-hand side of the equation, $a$ then representing twice the radius of curvature of the surface at the vertex, whilst $b$ is a measure of the eccentricity. Thus the surface will be hyperboloid when $b$ is positive, a paraboloid when $b$ is zero and an ellipsoid when $b$ is negative, the true spherical shape occurring when $b = -1$.

The materials used in the divergent inner components should preferably be such that in each such component the mean refractive index of the material of the divergent element exceeds that of the convergent element by between .05 and .15 whilst the Abbé V number of the material of the convergent element exceeds that of the divergent element by between 30 and 55.

It is especially advantageous to choose materials for all the elements of the objective such that the relative partial dispersion for any two wavelengths of the material used for one element of the objective, as defined by the expression $(n_1 - n_2)/(n_F - n_C)$, where $n_1$ and $n_2$ are the refractive indices of the material for such two wavelengths and $n_F$ and $n_C$ are the refractive indices of the material respectively for the spectrum lines F and C, is approximately the same as those for the same two wavelengths of the materials used for the other elements of the objective. Preferably the material used for each convergent element of the objective has relative partial dispersions substantially greater than those of usual glasses having similar Abbé V numbers, and crystalline calcium fluoride is especially useful for the convergent elements when used in conjunction with divergent elements made of glasses having approximately similar relative partial dispersions.

Thus, crystalline calcium fluoride has mean refractive index 1.43389 and Abbé V number 95.4 and one convenient flint glass for use with it has mean refractive index 1.53042 and Abbé V number 52.0. The relative partial dispersions for the two wavelengths represented by the C and d spectrum lines for calcium fluoride and for this flint glass are respectively .301 and .304, those for the lines $d$ and $e$ are .242 and .237, those for the lines $e$ and F are .457 and .459, and those for the lines F and $g$ are .543 and .549.

The axial air separation between the inner surfaces of the two divergent inner components conveniently lies between .12 and .20 times the equivalent focal length of the objective. Preferably the axial thickness of each of the divergent inner components lies between .16 and .26 times the equivalent focal length of the objective, and the two innermost surfaces (that is the rear surface of the front divergent component and the front surface of the rear divergent component) are dispersive, the sum of the powers of these surfaces lying between 4 and 6 times the equivalent power of the objective. The sum of the powers of the rear surface of the front convergent component and of the front surface of the rear convergent component is preferably collective and lies between .4 and 1.0 times the equivalent power of the objective. Conveniently, the sum of the powers of the two convergent outer components lies between 1.8 and 2.6 times the equivalent power of the objective.

A convenient practical example of symmetrical copying objective according to the invention is illustrated in the accompanying drawing, and numerical data for this example are given in the following table, in which $R_1$ $R_2$ ... represent the radii of curvature of the individual surfaces, the positive sign indicating that the surface is convex to the front and the negative sign that the surface is concave thereto, $D_1$ $D_2$ ... represent the axial thicknesses of the various elements, and $S_1$ $S_2$ $S_3$ represent the axial air separations between the components. The tables also give the mean refractive indices for the D-line and the Abbé V numbers of the materials used for the elements. In the case of an aspherical surface, the table gives, instead of the radius of curvature, the equation to the generating curve of the surface.

| Equivalent focal length 1.000. Relative Aperture F/1.8 | | | |
|---|---|---|---|
| Radius | Thickness or Air Separation | Refractive Index $n_D$ | Abbé V number |
| $R_1=+.4913$ | | | |
| | $D_1=.1330$ | 1.43389 | 95.4 |
| $R_2=-1.2503$ | | | |
| | $S_1=0$ | | |
| $R_3=y^2=$ .6293$x-$ .7806$x^2$ | | | |
| | $D_2=.1615$ | 1.43389 | 95.4 |
| $R_4=+5.9389$ | | | |
| | $D_3=.0494$ | 1.53042 | 52.0 |
| $R_5=+.2084$ | | | |
| | $S_2=.1615$ | | |
| $R_6=-.2084$ | | | |
| | $D_4=.0494$ | 1.53042 | 52.0 |
| $R_7=-5.9389$ | | | |
| | $D_5=.1615$ | 1.43389 | 95.4 |
| $R_8=y^2=$ .6293$x-$ .7806$x^2$ | | | |
| | $S_3=0$ | | |
| $R_9=+1.2503$ | | | |
| | $D_6=.1330$ | 1.43389 | 95.4 |
| $R_{10}=-.4913$ | | | |

The objective in this example is a symmetrical copying objective with unity magnification, but it will readily be appreciated that the dimensions can be modified to give a different magnification, if desired.

The relative aperture of an objective is usually defined as the ratio of the equivalent focal length F to the diameter of the entrance pupil $d$. In the case of an object at infinity the diameter of the entrance pupil $d$ becomes the effective diameter of the front surface of the objective, but in the case of finite conjugates it is convenient to define $d$ by the expression $2F(M+1)\sin\theta^1$, where M is the magnification and $\theta^1$ is the angle between the optical axis and the extreme marginal emergent ray forming an axial image point. It will be clear that this definition conforms to the usual definition in the case when the object is at infinity, since in that case M=0 and $d=2F\sin\theta^1$. In the example the relative aperture has been given as F/1.8 in the sense just defined, but it will be understood that the effective diameter of the front surface of the objective will not necessarily be F/1.8.

In the above example, two surfaces are made aspherical, namely the front surface of the front divergent component and the rear surface of the rear divergent component. The radius of curvature at the vertex of each of these surfaces is about .3146 times the equivalent focal length of the objective, and the convergent element of each divergent component is slightly thicker away from the optical axis than it would have been with a spherical outer surface of such radius. The surface is in the form of an ellipsoid of revolution.

The four convergent elements of the objective are all made of crystalline calcium fluoride and the two divergent elements are each made of the flint glass mentioned above having approximately the same relative partial dispersions as calcium fluoride.

The two innermost surfaces $R_5$ $R_6$ are both dispersive, the power of each of these surfaces being 2.545 times the equivalent power of the objective.

The inner surfaces $R_2$ $R_9$ of the two outer components are both collective, the power of each of these surfaces being .347 times the equivalent power of the objective.

The power of each of the two outer components is 1.09 times the equivalent power of the objective.

It will be appreciated that this example may be modified in a variety of ways within the scope of the invention. Thus for example one or more other air-exposed surfaces of the objective may be made aspherical, if desired, either instead of or in addition to the third and eighth surfaces, the asphericity in each case having the effect of slightly increasing the thickness of the associated element away from the optical axis.

The insertion of equals (=) signs in the radius column of the table, in company with plus (+) and minus (−) signs which indicate whether the surface is convex or concave to the front, is for conformity with the usual patent office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

What I claim as my invention and desire to secure by Letters Patent is:

1. An optical objective corrected for spherical and chromatic aberrations, coma, astigmatism, field curvature and distortion, and comprising two simple convergent outer components, the sum of the powers of the rear surface of the front convergent component and of the front surface of the rear convergent component being collective and lying between .4 and 1.0 times the equivalent power of the objective, two compound divergent inner components located between the two outer components and each comprising a convergent element and a divergent element made of a material whose mean refractive index exceeds that of the associated convergent element by between .05 and .15, and a diaphragm between the two inner components, the arithmetic mean between the curvatures of the internal contact surfaces in the two compound inner components lying between +.5 and −.5 times the equivalent power of the objectives (a curvature for this purpose being reckoned as positive when the surface is concave towards the diaphragm and as negative when the surface is convex towards the diaphragm), the four convergent elements of the objective all being made of materials having mean refractive index between 1.35 and 1.50 and Abbé V number between 70 and 110, whilst at least one of the air-exposed surfaces of the objective is aspherical and of such a shape that at any radial distance from the optical axis the thickness of the associated element is slightly greater than it would be with a true spherical surface having the same curvature as that at the vertex of the aspherical surface.

2. An optical objective corrected for spherical and chromatic aberrations, coma, astigmatism, field curvature and distortion, and comprising two simple convergent outer components, the sum of the powers of the rear surface of the front convergent component and of the front surface of the rear convergent component being collective and lying between .4 and 1.0 times the equivalent power of the objective, two compound divergent inner components located between the two outer components and each comprising a convergent element and a divergent element made of a material whose mean refractive index exceeds that of the associated convergent element by between .05 and .15 and whose Abbé V number is less than that of such convergent element by between 30 and 55, and a diaphragm between the two inner components, the arithmetic mean between the curvatures of the internal contact surfaces in the two compound inner components lying between +.5 and −.5 times the equivalent power of the objective (a curvature for this purpose being reckoned as positive when the surface is concave towards the diaphragm and as negative when the surface is convex towards the diaphragm), the four convergent elements of the objective all being made of materials having mean refractive index between 1.35 and 1.50 and Abbé V number between 70 and 110, whilst at least one of the air-exposed surfaces of the objective is aspherical and of such a shape that at any radial distance from the optical axis the thickness of the associated element is slightly greater by an amount not exceeding .03 times the said radial distance than it would be with a true spherical surface having the same curvature as that at the vertex of the aspherical surface.

3. An optical objective as claimed in claim 1, in which the axial air separation between the inner surfaces of the two divergent inner components lies between .12 and .20 times the equivalent focal length of the objective.

4. An optical objective as claimed in claim 1, in which the axial thickness of each of the divergent inner components lies between .16 and .26 times the equivalent focal length of the objective.

5. An optical objective as claimed in claim 4, in which the two innermost surfaces, that is the rear surface of the front divergent component and the front surface of the rear divergent component, are dispersive, and the sum of the powers of these two surfaces lies between 4 and 6 times the equivalent power of the objective.

6. An optical objective as claimed in claim 2, in which the axial air separation between the inner surfaces of the two divergent inner components lies between .12 and .20 times the equivalent focal length of the objective, and the axial thickness of each of such inner components lies between .16 and .26 times such equivalent focal length.

7. An optical objective as claimed in claim 1, in which the sum of the powers of the two convergent outer components lies between 1.8 and 2.6 times the equivalent power of the objective.

GORDON H. COOK.

REFERENCES CITED

The following references are of record in the file of this patent:

UNITED STATES PATENTS

| Number | Name | Date |
|--------|------|------|
| 1,955,591 | Lee | Apr. 17, 1934 |
| 2,100,290 | Lee | Nov. 23, 1937 |
| 2,100,291 | Lee | Nov. 23, 1937 |
| 2,117,252 | Lee | May 10, 1938 |
| 2,130,760 | Warmisham | Sept. 20, 1938 |
| 2,416,969 | Warmisham et al. | Mar. 4, 1947 |
| 2,455,808 | Reiss | Dec. 7, 1948 |